(12) United States Patent
Ahn et al.

(10) Patent No.: US 12,019,520 B2
(45) Date of Patent: Jun. 25, 2024

(54) ELECTRONIC DEVICE AND METHOD WITH ON-DEMAND ACCELERATOR CHECKPOINTING

(71) Applicant: Samsung Electronics Co., Ltd., Suwon-si (KR)

(72) Inventors: Jaehyung Ahn, Suwon-si (KR); Seongbeom Kim, Suwon-si (KR); Byungwoo Bang, Suwon-si (KR); Uiseok Song, Suwon-si (KR); Junyeon Lee, Suwon-si (KR); Wooseok Chang, Suwon-si (KR); Hun Seong Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/991,189

(22) Filed: Nov. 21, 2022

(65) Prior Publication Data
US 2023/0281081 A1 Sep. 7, 2023

(30) Foreign Application Priority Data
Mar. 4, 2022 (KR) ........................ 10-2022-0028354

(51) Int. Cl.
*G06F 11/00* (2006.01)
*G06F 11/14* (2006.01)

(52) U.S. Cl.
CPC ...... *G06F 11/1438* (2013.01); *G06F 11/1448* (2013.01)

(58) Field of Classification Search
CPC ............. G06F 11/1448; G06F 2201/84; G06F 11/1456; G06F 11/1451; G06F 11/1446
See application file for complete search history.

(56) References Cited

U.S. PATENT DOCUMENTS 5,301,309 A * 4/1994 Sugano ............... G06F 11/1438
714/E11.137
5,802,267 A * 9/1998 Shirakihara ......... G06F 11/1407
714/15

(Continued)

FOREIGN PATENT DOCUMENTS

GB 2582783 A 10/2020

OTHER PUBLICATIONS

Jain, Twinkle, et al. "Crac: Checkpoint-restart architecture for cuda with streams and uvm." *SC20: International Conference for High Performance Computing, Networking, Storage and Analysis.* IEEE, (2020). pp. 1-24.

(Continued)

*Primary Examiner* — Amine Riad
(74) *Attorney, Agent, or Firm* — NSIP Law

(57) ABSTRACT

An electronic device and method with on-demand accelerator checkpointing are provided. In one general aspect, an electronic device includes a host processor, and an accelerator configured to operate according to instructions transmitted by the host processor to the accelerator, wherein, a memory of the host processor and a memory of the accelerator are respectively checkpointed to a storage at respective different intervals, and in response to a determination that a failure has occurred in the host processor, the memory of the accelerator is checkpointed to the storage.

27 Claims, 9 Drawing Sheets

(56) References Cited

U.S. PATENT DOCUMENTS

| | | | | |
|---|---|---|---|---|
| 7,200,772 | B2* | 4/2007 | Datta | G06F 11/0724 |
| | | | | 714/13 |
| 7,409,589 | B2* | 8/2008 | Mack | G06F 11/1407 |
| | | | | 712/228 |
| 9,286,109 | B1* | 3/2016 | Backensto | G06F 11/1482 |
| 10,275,851 | B1 | 4/2019 | Zhao et al. | |
| 11,586,510 | B2* | 2/2023 | Santhar | G06F 11/1471 |
| 2010/0095100 | A1* | 4/2010 | Darrington | G06F 11/1438 |
| | | | | 712/228 |
| 2010/0095152 | A1 | 4/2010 | Darrington et al. | |
| 2014/0207738 | A1* | 7/2014 | Borda | G06F 9/461 |
| | | | | 707/649 |
| 2015/0363225 | A1* | 12/2015 | Cher | G06F 9/4818 |
| | | | | 718/108 |
| 2016/0266982 | A1* | 9/2016 | Iyengar | G06F 11/1451 |
| 2016/0378403 | A1* | 12/2016 | Bose | G06F 9/3863 |
| | | | | 711/104 |
| 2019/0324856 | A1 | 10/2019 | Zhao et al. | |
| 2020/0110670 | A1* | 4/2020 | Artico | G06F 11/1438 |
| 2020/0327019 | A1 | 10/2020 | Chung et al. | |
| 2021/0311633 | A1 | 10/2021 | Bates et al. | |
| 2023/0069905 | A1* | 3/2023 | Eisenberg | C07K 7/08 |

OTHER PUBLICATIONS

Daly, John. "A model for predicting the optimum checkpoint interval for restart dumps." *International Conference on Computational Science*. Springer, Berlin, Heidelberg, (2003). pp. 3-12.

Laosooksathit, Supada, et al. "Lightweight checkpoint mechanism and modeling in GPGPU environment." *Computing (HPC Syst)* Dec. 2010 (2010). pp. 1-7.

Xu, Xinhai, et al. "HiAL-Ckpt: A Hierarchical Application-Level Checkpointing for CPU-GPU Hybrid Systems." 2010 5th International Conference on Computer Science & Education. IEEE, 2010, (5 pages).

Extended European search report dated Jul. 25, 2023, in counterpart European Patent Application No. 23152733.4 (11 pages).

* cited by examiner

ELECTRONIC DEVICE AND METHOD WITH ON-DEMAND ACCELERATOR CHECKPOINTING

CROSS-REFERENCE TO RELATED APPLICATIONS

This application claims the benefit under 35 USC § 119(a) of Korean Patent Application No. 10-2022-0028354, filed on Mar. 4, 2022, in the Korean Intellectual Property Office, the entire disclosure of which is incorporated herein by reference for all purposes.

BACKGROUND

1. Field

The following description relates to an electronic device and method with on-demand accelerator checkpointing.

2. Description of Related Art

A checkpoint may be performed for stable execution of applications. By storing a state and/or data of an executing application at a determined time, and doing so while the application is being executed, if the application's execution terminally fails for some reason, the checkpoint may be used to resume execution of the application from a time of the checkpoint.

As applications become more advanced and complicated, accelerators are more commonly used for application execution.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an electronic device includes a host processor, and an accelerator configured to operate according to instructions transmitted by the host processor to the accelerator, wherein, a memory of the host processor and a memory of the accelerator are respectively checkpointed to a storage at respective different intervals, and in response to a determination that a failure has occurred in the host processor, the memory of the accelerator is checkpointed to the storage.

The memory of the accelerator may be checkpointed in response to the determination that a failure has occurred in the host processor, data stored in the memory of the accelerator may be transmitted to, and stored in, the storage without involving the host processor.

The memory of the host processor may be recurringly checkpointed to the storage at a first interval, and the memory of the accelerator may be recurringly checkpointed to the storage at a second interval that may be longer than the first interval.

The first interval may be determined based on a failure rate of the host processor, and the second interval may be determined based on a failure rate of the accelerator that may be different than the failure rate of the host processor.

When the memory of the accelerator may be checkpointed to the storage in response to the determination that a failure has occurred in the host processor: the host processor, after being restarted or reset, may be configured to receive, from the host storage, a most recent checkpoint of the host memory, and the accelerator may be configured to, based on the determination that a failure has occurred in the host processor, receive from the storage the accelerator data checkpointed in response to the determination that a failure has occurred.

Indicia of operations performed in the host processor before the failure in the host processor occurs may be stored in the storage, and at least some of the operations indicated by the indicia of operations may be executed or applied, and the accelerator data received from the storage may be maintained while the host processor executes or applies the at least some of the operations indicated by the indicia of operations.

The accelerator data may be maintained by not executing, among the operations indicated by the indicia of operations, one or more operations that change a state and/or the memory of the accelerator.

Among the operations indicated by the indicia of operations, operations that read a state and/or the memory of the accelerator may be applied by receiving, from the storage, previously stored result values of the respective operations that read a state and/or the memory of the accelerator.

An external device may be configured to monitor whether a failure occurs in the host processor, and when the external detects a failure, may issue an instruction for performing a checkpoint on the accelerator.

A controller may monitor whether there is a failure of the host processor, and the controller may, when a failure of the host processor is detected, transmit an instruction to perform a checkpoint on the accelerator.

A state of the electronic device may be set by loading, to the memory of the accelerator, the accelerator checkpoint taken in response to the determination of a failure in the host processor, loading, to the memory of the host processor, a most recent checkpoint of the host processor taken at an interval of checkpointing the host processor, and the accelerator checkpoint taken in response to the determination of a failure in the host processor may be based on operations of an application that occur after the most recent checkpoint of the host processor was taken, and execution of the application may resume according to the set state.

The execution of the application may include performing training of, or inferencing using, the accelerator in the set state.

In one general aspect, a method includes capturing, to a storage, host-checkpoints of a memory of a host processor of an electronic device, wherein the host-checkpoints are captured at first intervals, capturing, to the storage, accelerator-checkpoints of a memory of an accelerator device of the electronic device, wherein the accelerator-checkpoints are captured at second intervals that are different than the first intervals, and based on a failure occurring in the host processor, capturing, to the storage a failure-checkpoint of the memory of the accelerator.

The failure-checkpoint may be captured without involving the host processor.

A duration of the first intervals may be proportional to a failure rate of the host processor, and a duration of the second intervals may be proportional to a failure rate of the accelerator.

In association with the failure occurring in the host processor, the method may further include: restarting or resetting the host processor, restoring a most recently captured host-checkpoint from the storage to the memory of the host processor, and restoring the failure-checkpoint of the accelerator from the storage to the accelerator.

The method may further include: logging, to the storage, during a period of time from the most recently captured host-checkpoint to a time of the failure, indicia of operations performed in the host processor, and based on the restored most recently captured host-checkpoint, executing or applying, according to the indicia of the operations, in the host processor, at least some of the operations indicated by the indicia of the operations, wherein, while the host processor executes or applies the at least some of the operations, the accelerator is configured to maintain the accelerator data received from the storage such that the accelerator data in the accelerator memory has not changed after the at least some of the operations have been executed or applied.

The executing or applying of the at least some of the operations in the host processor may include either not executing or applying one or more operations indicated by the indicia that would change a state and/or the memory of the accelerator, or applying one or more operations of the operations indicated by the indicia that read a state and/or the memory of the accelerator by receiving result values of the one or more operations from the storage, the result values having been stored in the storage by the logging.

In one general aspect, a method includes, before a failure of a host processor: executing operations of an application on a host processor and on an accelerator device, wherein a host memory of the host processor and an accelerator memory of the accelerator device may be updated as the operations may be executed, periodically capturing a host-checkpoint of the host memory to a storage, and responsive to a failure of the host processor, capturing an on-demand accelerator-checkpoint, and after recovering from the failure of the host processor, resuming executing the operations of the application based on restoring a lastly captured host-checkpoint and based on restoring the on-demand accelerator checkpoint.

The on-demand accelerator checkpoint may include state corresponding to a portion of the operations executed after the lastly captured host-checkpoint, wherein the recovering loses host memory state corresponding to the portion of the operations that have not been checkpointed, and after recovering from the failure of the host processor, resuming executing the operations of the application based on restoring the last periodically captured host-checkpoint and based on restoring the on-demand accelerator checkpoint.

DETAILED DESCRIPTION

Figure 1:
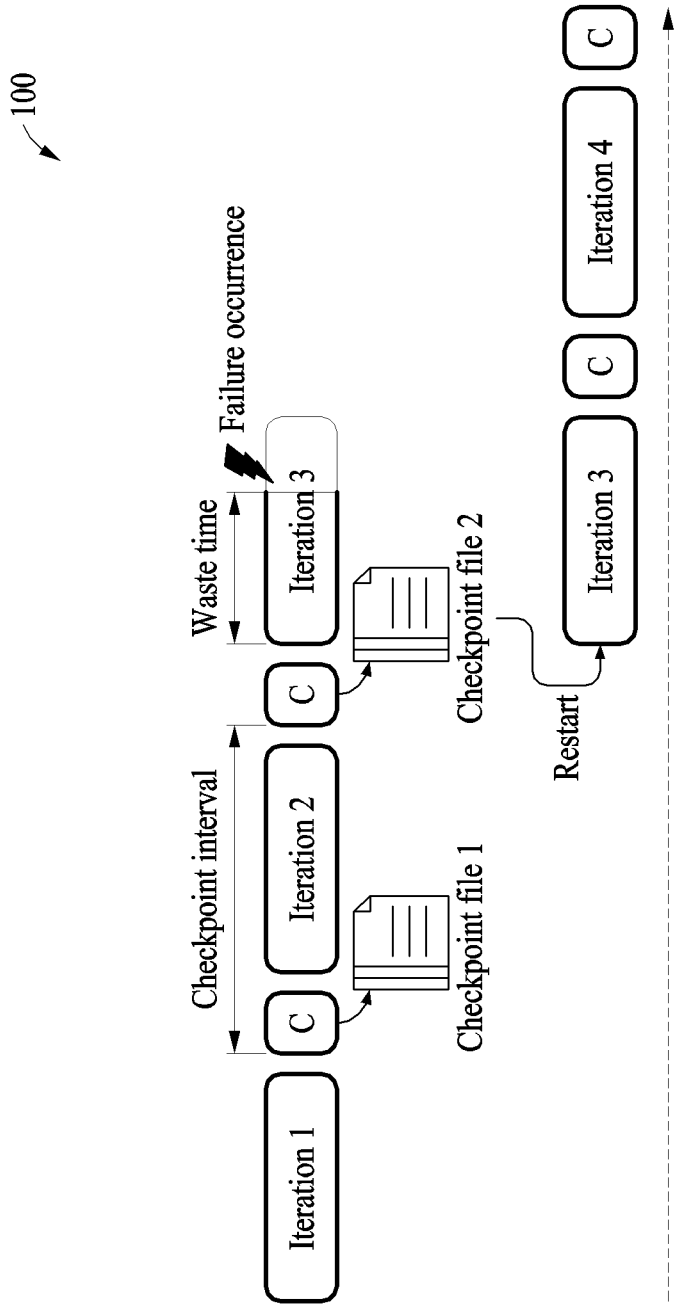
FIG. 1 illustrates an example of a checkpoint operation and a recovery operation, according to one or more embodiments.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. As used herein, the term "and/or" includes any one and any combination of any two or more of the associated listed items. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof.

Throughout the specification, when a component or element is described as being "connected to," "coupled to," or "joined to" another component or element, it may be directly "connected to," "coupled to," or "joined to" the other component or element, or there may reasonably be one or more other components or elements intervening therebetween. When a component or element is described as being "directly connected to," "directly coupled to," or "directly joined to" another component or element, there can be no other elements intervening therebetween. Likewise, expressions, for example, "between" and "immediately between" and "adjacent to" and "immediately adjacent to" may also be construed as described in the foregoing.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or embodiment, e.g., as to what an example or embodiment may include or implement, means that at least one example or embodiment exists where such a feature is included or implemented, while all examples are not limited thereto.

Hereinafter, examples will be described in detail with reference to the accompanying drawings. When describing the examples with reference to the accompanying drawings, like reference numerals refer to like or similar components and a repeated description related thereto will be omitted.

FIG. 1 illustrates an example 100 of a checkpoint operation and a recovery operation, according to one or more embodiments.

Referring to FIG. 1, a checkpoint operation performed at intervals and a recovery operation performed in response to a failure occurring are illustrated as an example.

Performing a checkpoint may involve storing data of an application at predetermined intervals during application execution. A checkpoint may be used later, when execution of the application is interrupted due to any of various possible causes, to restart the application from a time of the checkpoint. A checkpoint may include checkpointed state and/or data of the application at a point in time and may be stored in a storage. Generally, the data of an application checkpoint will be state/data of the application at a point in time associated with the checkpoint. Content of a checkpoint will usually represent state/data just up to (or at) the point in time, but not after the point in time. For stable storing of checkpointed data, the storage may be configured not to be affected by interruption of execution of the application or events that may cause the same. For example, the storage may be a remote storage server, a cloud storage service, or the like, that is different from a device used for executing the application, but an example may not be limited to the foregoing example. In some examples, an internal storage may be used. In other examples the storage may be a combination of internal and external storage.

In the example of FIG. 1, an electronic device may perform checkpoints at predetermined checkpoint intervals during application execution ("predetermined" meaning determined any time before or up to the time when an interval ends). Here, "during application execution" does not mean that the application is necessarily executing during the performance of a checkpoint; the application may be briefly paused or suspended as (depending on the application) might be necessary to ensure that the checkpoint captures a consistent (and as complete as might be needed for the application) state of the application at the time of the checkpoint. A failure may occur during the execution of the application, which may interrupt or interfere with the application's execution. The electronic device may restart the application from a most recent checkpointed time. As used herein, "restart" refers to the general idea of resetting execution of the application, whether by starting new process(es), rebooting the electronic device, starting new threads, resetting a processor, or the like. The application may begin executing again from the most recent checkpointed time, and time from the checkpoint to a time of the failure occurring time may be wasted execution time, i.e., work performed by the application after the checkpoint is lost.

Although such wasted time may be reduced by reducing the length of a checkpoint interval (time between checkpoints), frequent checkpointing may increase usage of resources or overall time used for checkpointing and may thus degrade overall application or system performance. In addition, as an accelerator, besides a host processor included in the electronic device, is used to execute an application, a memory of the accelerator may also be checkpointed. Furthermore, as memory capacity of such accelerators may increase over time, more time may be needed for a checkpoint operation that checkpoints an accelerator. Therefore, the checkpoint interval may be determined based on the waste time and checkpoint overhead, as described in detail with reference to FIG. 2.

Figure 2:
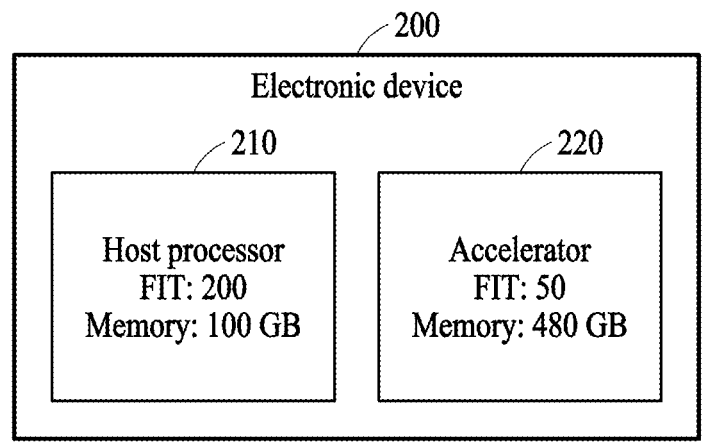
FIG. 2 illustrates an example of components in an electronic device and checkpoint related data thereof, according to one or more embodiments.

FIG. 2 illustrates an example of components in an electronic device and checkpoint related data thereof, according to one or more embodiments.

Referring to FIG. 2, an electronic device 200 may include a host processor 210 and an accelerator 220. The electronic device 200 may be, or may include, for example, various computing devices, e.g., a mobile phone, a smartphone, a tablet computer, an e-book device, a laptop, a personal computer (PC), a desktop, a workstation, a virtual machine, a cloud service, or a server), various wearable devices (e.g., a smart watch, smart eyeglasses, a head-mounted display (HMD), or smart clothes), various home appliances (e.g., a smart speaker, a smart television (TV), or a smart refrigerator), or other devices (e.g., a smart vehicle, a smart kiosk, an Internet of things (IoT) device, a walking assist device (WAD), a drone, or a robot.

The electronic device 200 may execute one or more applications, and in this case, may use both the host processor 210 and the accelerator 220 to perform operations of a given application. The host processor 210 may be a device for controlling an operation of components included in the electronic device 200 and may include, for example, one or more central processing units (CPUs). The accelerator 220 may be a device operating under the control of the host processor 210 and may process tasks that are more efficiently processed by a separate dedicated processor (e.g., the accelerator 220) rather than by a general-purpose host processor (e.g., the host processor 210) due to the characteristics of operations based on a neural network, for example. The accelerator 220 may include, for example, a graphics processing unit (GPU), a neural processing unit (NPU), a tensor processing unit (TPU), input/output (I/O) processors, and/or the like. Multiple accelerators of multiple computation-types may be included with the electronic device; "accelerator" as used herein, refers to one or more accelerator devices of one or more types (described techniques for checkpointing a single accelerator device are readily extended to multiple accelerators in a same system).

When executing an application by using the host processor 210 and the accelerator 220, a checkpoint operation may be performed at a predetermined time, and in this case, a memory capacity of the host processor 210 to be checkpointed may be 100 gigabytes (GB) and a memory capacity of the accelerator 220 to be checkpointed may be 480 GB, for example. In addition, a failure in time (FIT) rate of the host processor 210 may be 200, and a FIT rate of the accelerator 220 may be 50, for example. In this case, a FIT rate may be an expected number of failures to occur during a predetermined period, and an increased FIT rate is an increased number of failure occurrences within the predetermined period. However, the foregoing numerical values of memory capacity or FIT rate are provided for ease of description, and examples are not limited thereto. To elaborate, FIT rate refers to a failure rate in terms of failures expected per unit of time, e.g. a FIT rate of 100 might represent 100 failures per unit of time, e.g., 100 failures every 24 hours. The FIT rate may be proportional to the inverse of a mean time between failure (MTBF) or the like. Any type of statistic correlated with failure rate may be used, and FIT rate is a non-limiting example used herein for explanation. The term "failure rate", as used herein, refers to any measure that is proportional (inversely or not) to how many errors are expected, predicted (e.g. modeled), or have historically occurred, as a function of time.

A failure in the electronic device 200 in which an application is executed may be any issue that occurs in some of components (e.g., the host processor 210, the accelerator 220, a memory, etc.) included in the electronic device 200. A failure may be any event that affects the ability of the application to execute, or to execute correctly, e.g., a hardware failure, a logic/code failure (e.g., an improper memory reference in a kernel), an operating system failure, loss of network connectivity, etc. When a failure occurs in the electronic device 200, regardless of a component in which an issue occurs, the electronic device 200 (and/or components thereof) may generally restart, for example. The more components that the electronic device 200 includes, the greater the probability of a failure occurring.

In the example of FIG. 2, the FIT rate of the electronic device 200 may be determined to be a sum of the FIT rates of components thereof, e.g., 200+50=250. A checkpoint interval may be determined in inverse proportion to the FIT rate, or some number proportional thereto. However, the accelerator 220 may have a considerably higher memory capacity than the host processor and a FIT rate that might be significantly less than the FIT rate of the host processor 210. That is, the accelerator may fail less frequently and may take longer to checkpoint. In this case, the accelerator 220 may be sufficiently checkpointed at a checkpoint interval corresponding to 1/50 rather than a shorter interval corresponding to 1/250, for example. That is, the accelerator 220 may be unnecessarily frequently checkpointed if checkpointed at an interval for the FIT rate of the host processor 210, and this may cause a resource waste and performance degradation of the electronic device 200, for example.

Moreover, a failure of the electronic device 200 may not involve failures of all components included in the electronic device 200. For example, even when a failure occurs in the host processor 210, the accelerator 220 may be capable of continuing to operate normally or with some functionality (e.g., with functionality to read out its state), and, without involving the host processor 210, data of the accelerator 220 may be transmitted to an external storage through an internal interface (e.g., a peripheral component interconnect express (PCIe) interface and/or a network interface card (NIC)). That is, a memory of the accelerator 220 may be checkpointed on demand despite a failure occurring only in the host processor 210 (or some other component), and thus, the memory of the accelerator 220 may not need to be checkpointed as frequently as the host processor 210 and doing so might be wasteful.

Therefore, when setting a checkpoint interval (checkpoint frequency) for periodic routine checkpointing of an accelerator (e.g., the accelerator 220) having a relatively increased capacity, the FIT rate of only the accelerator (e.g., the accelerator 220) may be applied for determining its checkpoint interval, and FIT rates of other components (e.g., the host processor 210, etc.) may be disregarded. In this case, a checkpoint interval of the accelerator may increase, and related overall checkpointing overhead may thus be decreased. In other words, different checkpoint intervals may be set for respective components, and thus, the electronic device 200 may have more optimal performance while stably executing an application with a more minimal checkpoint operation. For example, the host processor 210 may perform a checkpoint operation at a first interval corresponding to 1/200, and the accelerator 220 may perform a checkpoint operation at a second interval corresponding to 1/50 (the host processor 210 may checkpoint more frequently).

Figure 3:
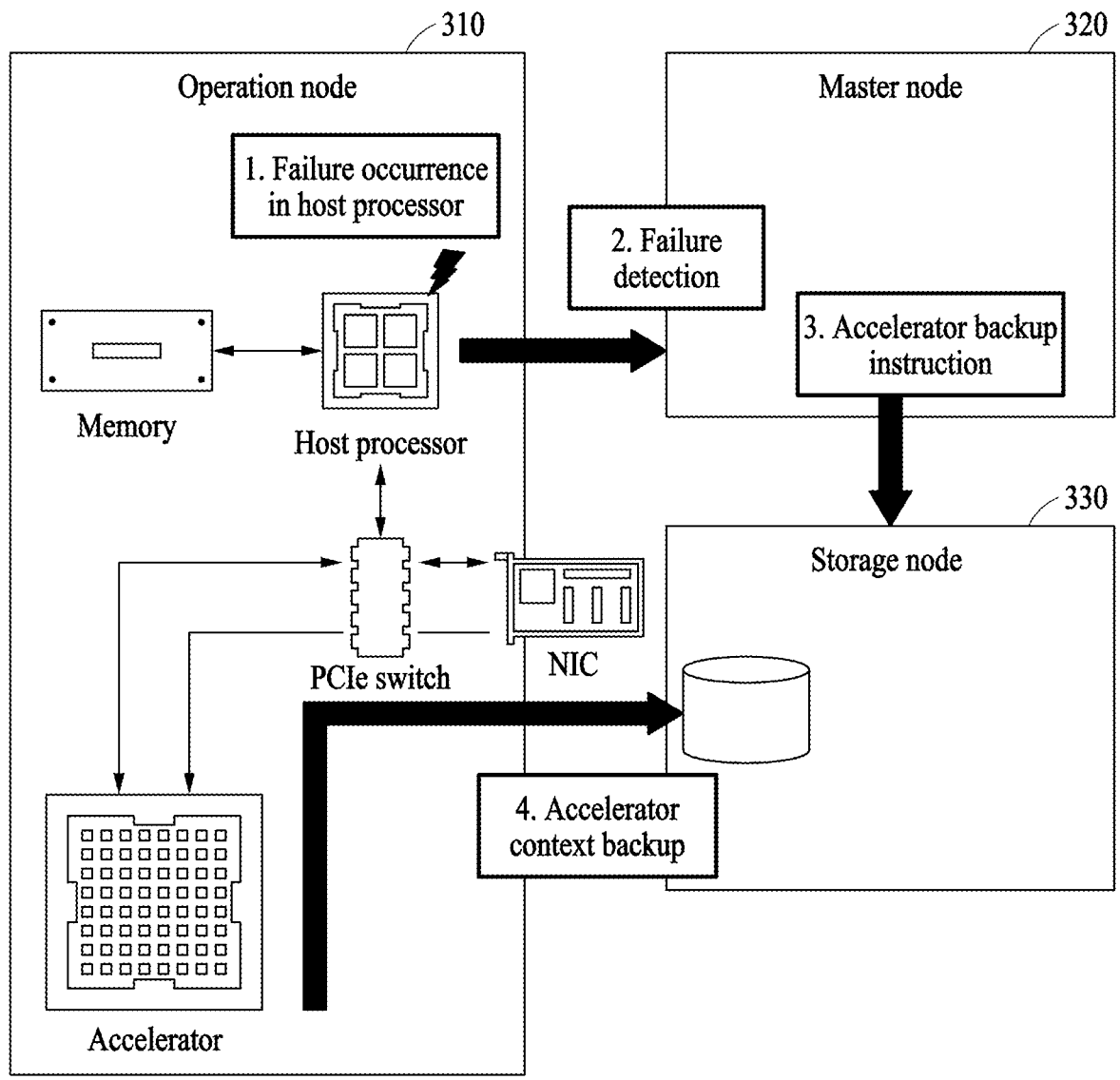
FIG. 3 illustrates an example of on-demand checkpointing a memory of an accelerator in response to a failure occurring in a host processor, according to one or more embodiments.

FIG. 3 illustrates an example of an operation of on-demand checkpointing a memory of an accelerator, in response to a failure occurring in a host processor, according to one or more embodiments.

Referring to FIG. 3, FIG. 3 illustrates an example where a checkpoint operation is performed on-demand responsive to a failure occurring in the host processor.

Failures may be classified as an accelerator-safe failure and an accelerator-critical failure. The accelerator-safe failure may be a type of failure that, despite the failure occurring, the memory of the accelerator may still be checkpointed. The accelerator critical-failure may be a type of failure that, after the failure occurs, the memory of the accelerator may not be able to be read out and stored (i.e., checkpointed on-demand), which may include, for example, a GPU memory double-bit error, a network failure, and the like. A failure described with reference to FIG. 3 is assumed to be an accelerator-safe failure, and the accelerator-critical failure is described in detail with reference to FIG. 7.

An operation node 310 may be a node for executing an application and may correspond to an electronic device (e.g., the electronic device 200) described above. The operation node 310 may include a host processor, an accelerator, a memory, a PCIe (Peripheral Component Interconnect Express) switch, and a NIC (network interface card). Any such components may also be virtual components and any such components may be shared with other operation nodes, partitioned between operation nodes, or the like. The memory may include dynamic random access memory (DRAM) that may be used as a main memory of the operation node 310. The PCIe switch may perform data movement between components included in the operation node 310, and the NIC may transmit data out of or into the operation node 310.

A master node 320 may monitor state of the operation node 310. For example, the master node 320 may regularly monitor whether a failure has occurred in (or in relation to) the operation node 310.

A storage node 330 may store data for checkpointing from the operation node 310. The storage node 330 may be a separate node, which may not be affected by a failure in the operation node 310, and include, for example, a remote storage server, a remote storage service, or the like.

In operation 1, a failure may occur in the host processor. Due to the failure occurring, the host processor may no longer operate normally (or at all), but the other components, for example, the accelerator, the PCIe switch, and the NIC, of the operation node 310 may continue to operate normally. Therefore, the storage node 330 is capable of reading or receiving data of the accelerator through the NIC.

In operation 2, the master node 320 may detect a failure occurring in the operation node 310. Although an example may not be limited to the following example, the master node 320 may detect a failure in the operation node 310 by using a heartbeat. For example, the operation node 310 may regularly transmit a ping signal to the master node 320, and when the ping signal is not detected from the operation node 310, the master node 320 may determine that a failure has occurred in the operation node 310.

In operation 3, the master node 320 may transmit an accelerator backup instruction to the storage node 330. The accelerator backup instruction may be an instruction for checkpointing, on demand, a memory of the accelerator.

In operation 4, based on the backup instruction, the storage node 330 may checkpoint the memory of the accelerator of the operation node 310, and such a checkpoint operation may be performed without necessarily involving the host processor. For example, the host processor and/or the memory thereof, may be bypassed or avoided by transmitting data from the memory of the accelerator via the PCIe switch and the NIC to the storage node 330 based on PCIe peer-to-peer (P2P) communication. As described above, such an on-demand accelerator checkpoint operation may be performed since a failure, in the example, only occurs in the host processor and the other components are still able to otherwise operate normally.

Figure 4:
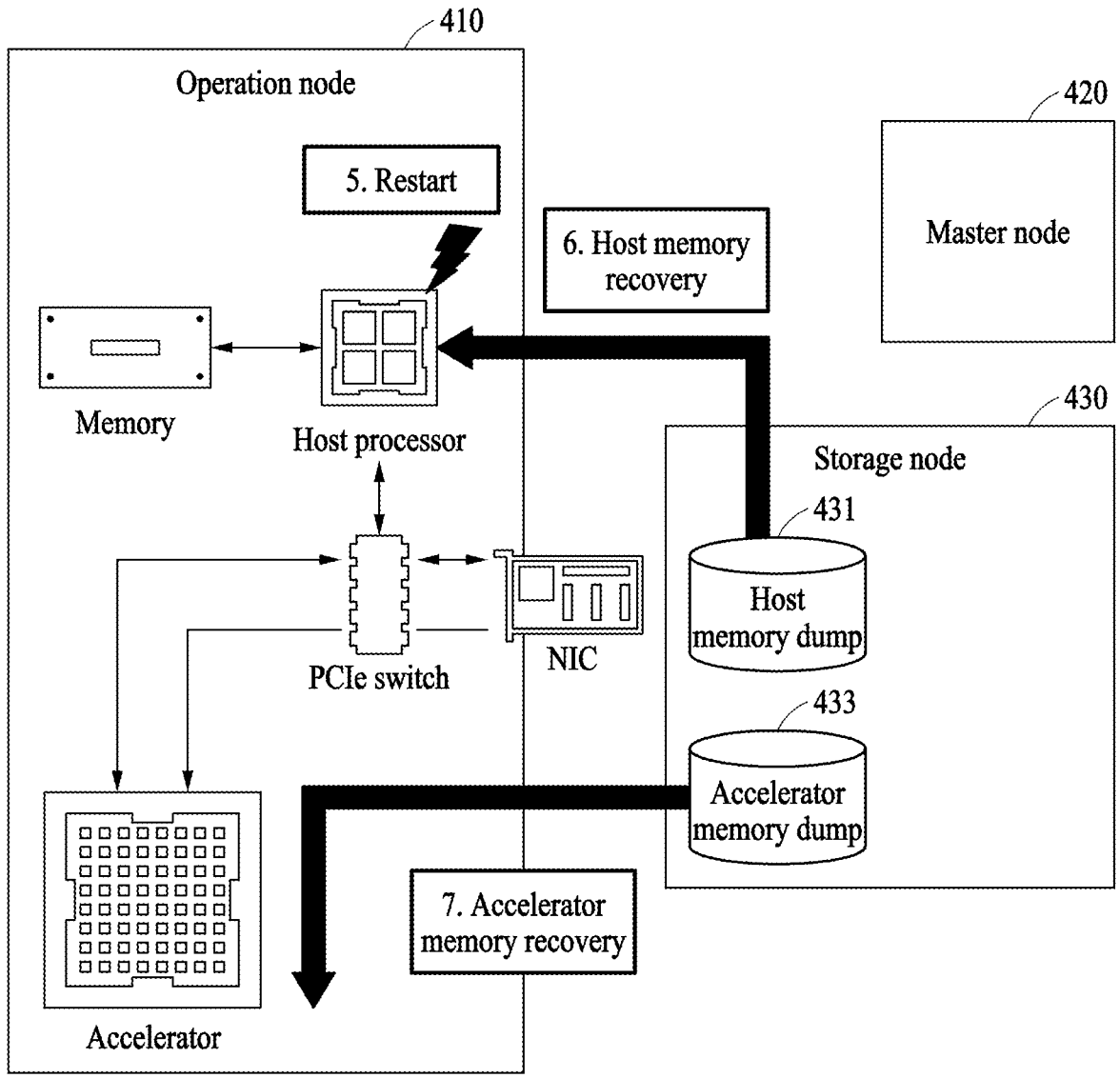
FIG. 4 illustrates an example of a recovery operation performed in response to a failure occurring in a host processor, according to one or more embodiments.

FIG. 4 illustrates an example of a recovery operation performed in response to a failure occurring in a host processor, according to one or more embodiments.

Referring to FIG. 4, a failure occurring in the host processor and a recovery operation when a checkpoint operation is performed are illustrated as an example.

In operation 5, when a checkpoint operation for a memory of an accelerator is completed and an accelerator memory dump 433 has been generated (e.g., on-demand as discussed with reference to FIG. 3), an operation node 410 may restart or reset. In this case, a master node 420 may be involved in the restarting of the operation node 410, but implementations are not limited to the foregoing example.

In operation 6, a host memory dump 431 stored in a storage node 430 may be transmitted to the host processor of the operation node 410. The host memory dump 431 may be a regularly checkpointed memory of the host processor and may include most recently checkpointed data of the host processor's memory (in some examples, incremental checkpoints may be performed and a most recent checkpoint may include previously checkpointed data of the host memory). As discussed above, the host may be checkpointed at a different interval than checkpointing of the accelerator. In some examples, the accelerator may be checkpointed only on-demand and only the host processor is checkpointed at regular intervals.

In operation 7, the accelerator memory dump 433 stored in the storage node 430 may be transmitted to the host processor of the operation node 410. The accelerator memory dump 433 may include data checkpointed on demand in response to a failure occurring in the host processor (e.g., per operation 4 of FIGS. 3 and/or 5).

Figure 5:
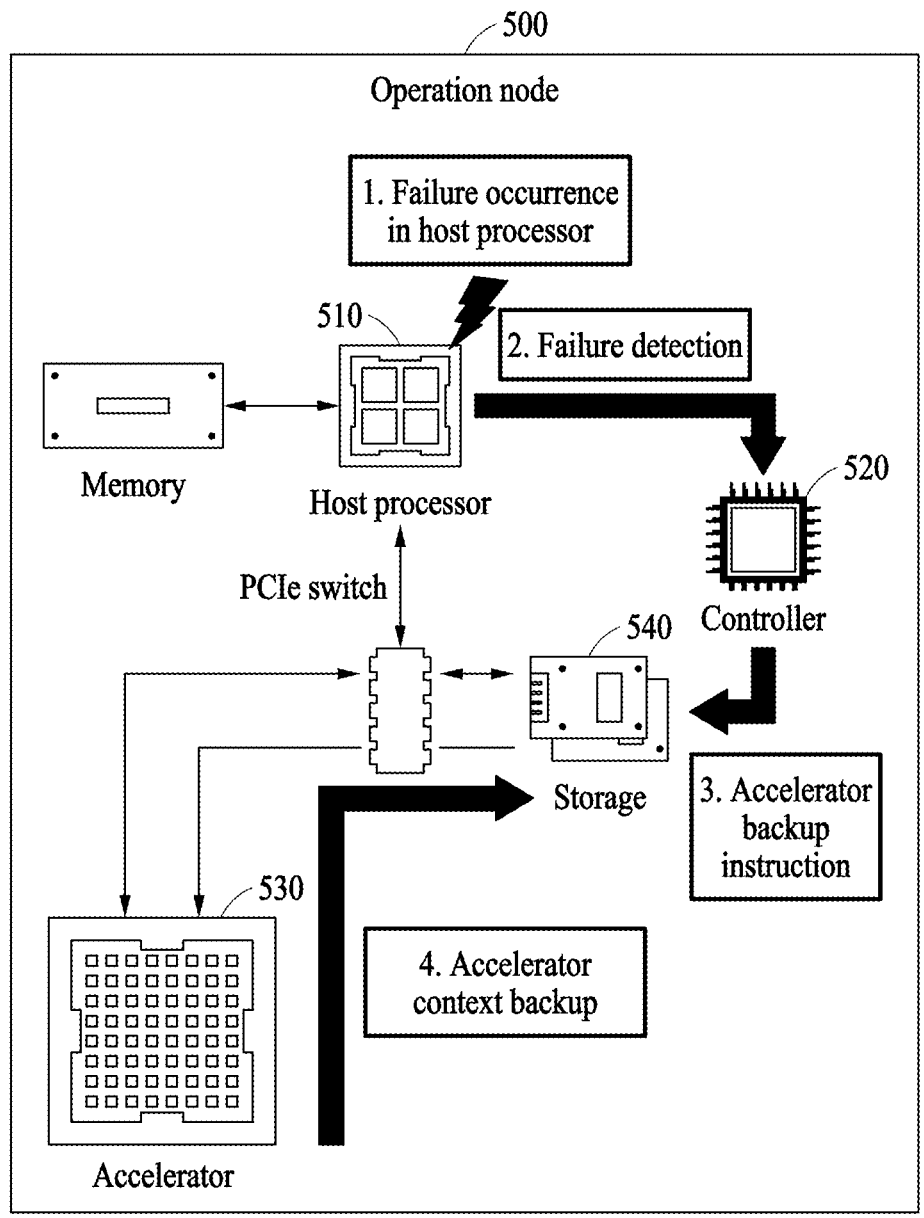
FIG. 5 illustrates another example of an operation of on-demand checkpointing a memory of an accelerator, according to one or more embodiments.

FIG. 5 illustrates another example of an operation of on-demand checkpointing a memory of an accelerator, according to one or more embodiments.

Referring to FIG. 5, an operation node 500 storing data to be checkpointed from an accelerator 530 to a storage 540 in the operation node 500 is illustrated as another example. The example illustrated in FIG. 5 may correspond to either (i) a case of performing a checkpoint operation only by the operation node 500 without a separate master node or a separate storage node or (ii) a case of a failure in a NIC included in the operation node 500 with a separate master node or a separate storage node, but the separate master node or the separate storage node may not be involved in a checkpoint operation, e.g., checkpointing the accelerator 530.

The operation node 500 may include a host processor 510, a controller 520, the accelerator 530, the storage 540, a memory, and a PCIe switch.

In operation 1, a failure may occur in the host processor 510. Due to the failure occurring, the host processor 510 may not operate or may not operate correctly, but other components of the operation node 500 may be capable of continuing to operate normally. Therefore, a memory of the accelerator 530 may be checkpointed on demand (e.g., based on the failure of the host processor 510).

In operation 2, the controller 520 may detect a failure in the host processor 510. The controller 520 may be a device for detecting whether a failure occurs in components in the operation node 500 and include, for example, a baseboard management controller (BMC) or similar component that may operate despite failure of the host processor 510.

In operation 3, the controller 520 may transmit an accelerator backup instruction to the storage 540. In this case, the accelerator backup instruction may be an instruction for checkpointing, on demand, the memory of the accelerator 530. The storage 540 may be a non-volatile storage and may include, for example, a solid state drive (SSD), but an example may not be limited to the foregoing example.

In operation 4, the storage 540 may checkpoint the memory of the accelerator 530, and such a checkpoint operation may be performed without necessarily involving the host processor 510 when the accelerator 530, the storage 540, and the PCIe switch operate normally. In some examples, there may be some minimal involvement of the host processor 510, for example, reading out a register to the controller 520. However, generally, the host processor 510 may not be involved in transferring the memory of the accelerator to the storage 540.

When the checkpoint operation for the memory of the accelerator 530 is completed, the operation node 500 may restart, reboot, reset, etc. A host memory dump previously stored (e.g., checkpointed per a checkpoint interval of the host processor 510) in the storage 540 may be transmitted to the restarted host processor 510 and loaded into the memory thereof, and an accelerator memory dump may be transmitted to the accelerator 530 and loaded into the memory thereof. The description provided with reference to FIG. 4 may also apply to the recovery operation.

The descriptions provided with reference to the foregoing examples may also apply to the following examples. For example, when the operation node 500 includes a plurality of accelerators, the checkpoint operation and recovery operation described above with reference to the foregoing examples may be performed on or applied to all or some of the plurality of accelerators. In other words, different accelerators of a host may be checkpointed in different ways. Moreover, the storage for storing a checkpoint may be either internal/local storage of the host, external storage, or a combination thereof, and the makeup of such storage may differ for different accelerators of the same host.

In the checkpoint operation described above, compressing data transmitted to a storage node or an internal storage may effectively decrease checkpoint overhead. For example, data may be compressed in an accelerator, and the compressed data may be transmitted to the storage node or the internal storage before being checkpointed (stored in the storage). In addition, data to be checkpointed may be delta encoded and transmitted. Delta encoding may be a method of storing or transmitting data in a form of a difference between sequential data. Applying the delta encoding to data stored in a memory of the accelerator (e.g., the accelerator 530) and transmitting the delta-encoded data to the storage node or the internal storage may decrease the quantity of transmitted data and effectively decrease checkpoint overhead.

Figure 6:
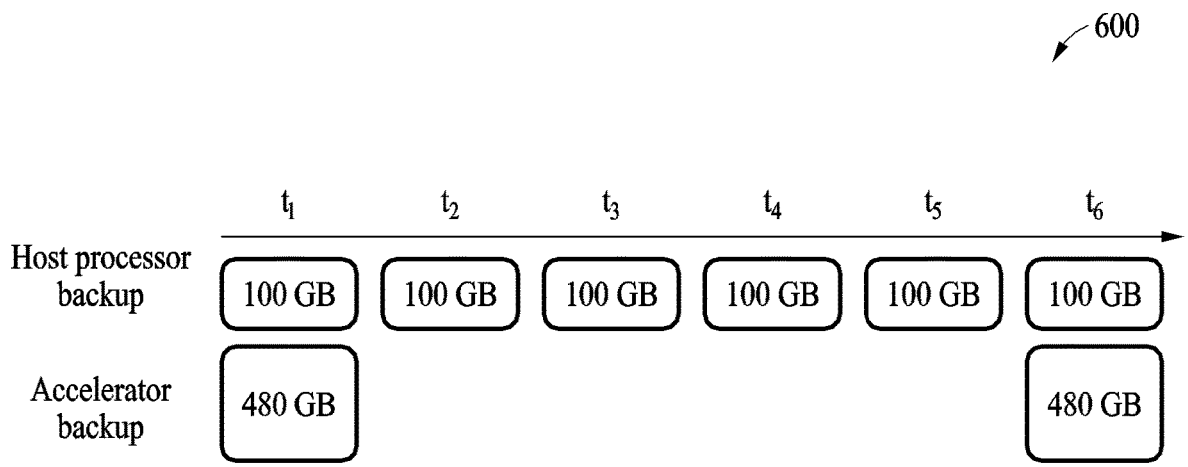
FIG. 6 illustrates an example of checkpoint time intervals, according to one or more embodiments.

FIG. 6 illustrates an example 600 of checkpoint time intervals, according to one or more embodiments.

Referring to FIG. 6, a host processor backup may be performed at a first interval or timing, and an accelerator backup may be performed at a second interval or timing. As described above with reference to FIG. 2, when a FIT rate of a host processor is greater than a FIT rate of an accelerator, the first (host) interval may be shorter than the second (accelerator) interval. The intervals may be scheduled to repeat, i.e., the host processor and the accelerator may be regularly checkpointed at different respective frequencies. The first interval may be determined based on a probability or prediction (or history) of failure frequency of the host processor, and the second interval may be determined based on a probability or prediction (or history) of failure frequency of the accelerator. As such, the host processor and the accelerator may not affect each other's checkpoint intervals, and optimized checkpoint intervals may be determined based on respective failure frequencies (or the like) thereof. In the example of FIG. 6, the accelerator may be checkpointed once for every five checkpoints of the host processor. In some embodiments, the second interval may be a multiple of the first interval so that at times a full checkpoint of the host (host and accelerator) may be acquired. In other embodiments, the first and second intervals are not synchronized and may usually occur at different times.

Figure 7:
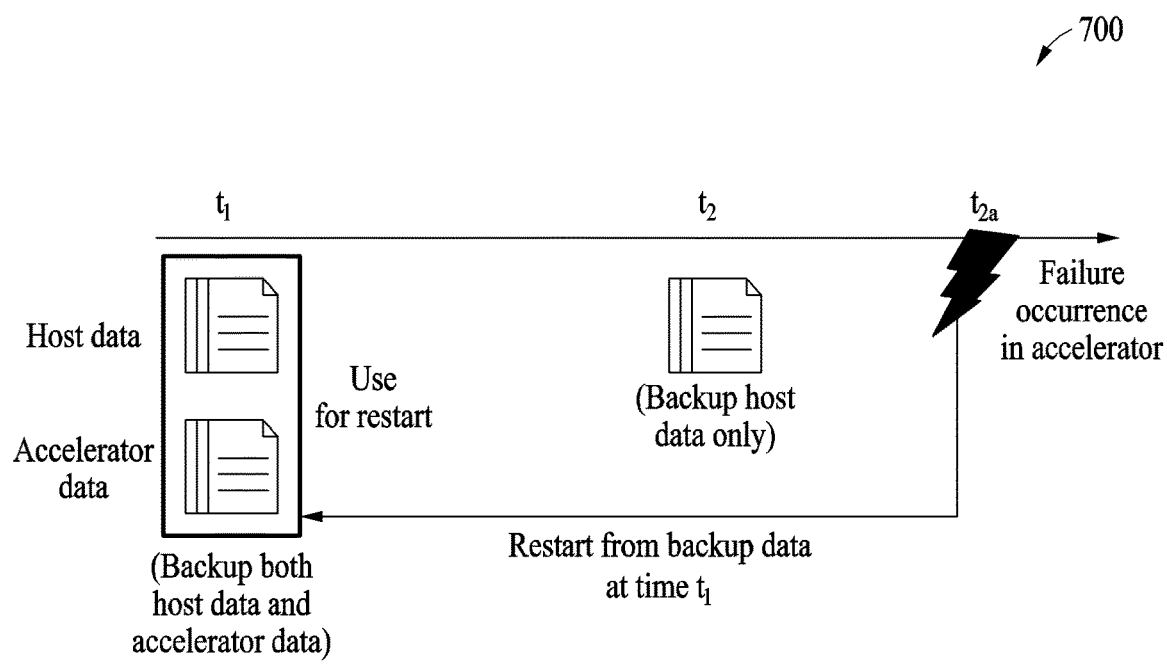
FIG. 7 illustrates an example of a recovery timed in response to a failure occurring in an accelerator, according to one or more embodiments.

FIG. 7 illustrates an example 700 of a recovery timed in response to a failure occurring in an accelerator, according to one or more embodiments.

Referring to FIG. 7, at time t1, a memory of a host processor and a memory of an accelerator both may be checkpointed (e.g., when their intervals coincide), and host data and accelerator data may be stored in a storage (local and/or external). At time t2, the host's checkpoint interval being shorter, only the memory of the host processor (or at least, not the memory of the accelerator) may be checkpointed, and the host data may be stored in the storage. Thereafter and before time t3 (before further checkpointing), at time t2a, a failure may occur in the accelerator. This failure in the accelerator may correspond to an accelerator-critical failure described above. In such a case, an on-demand checkpoint operation of the memory of the accelerator may not be performed, and thus, a recovery operation may be performed to recover to a time when accelerator data was most recently stored (checkpointed, e.g., per the second interval). In the example of FIG. 7, the accelerator data stored/checkpointed at time t1 is the accelerator data was most recently stored, and thus, after a restart of the electronic device, the host data and the accelerator data stored at time t1 may respectively be transmitted to the host processor and the accelerator, and then, a recovery operation may be performed, recovering the host and accelerator to resume computation from a state corresponding to time t1.

Figure 8:
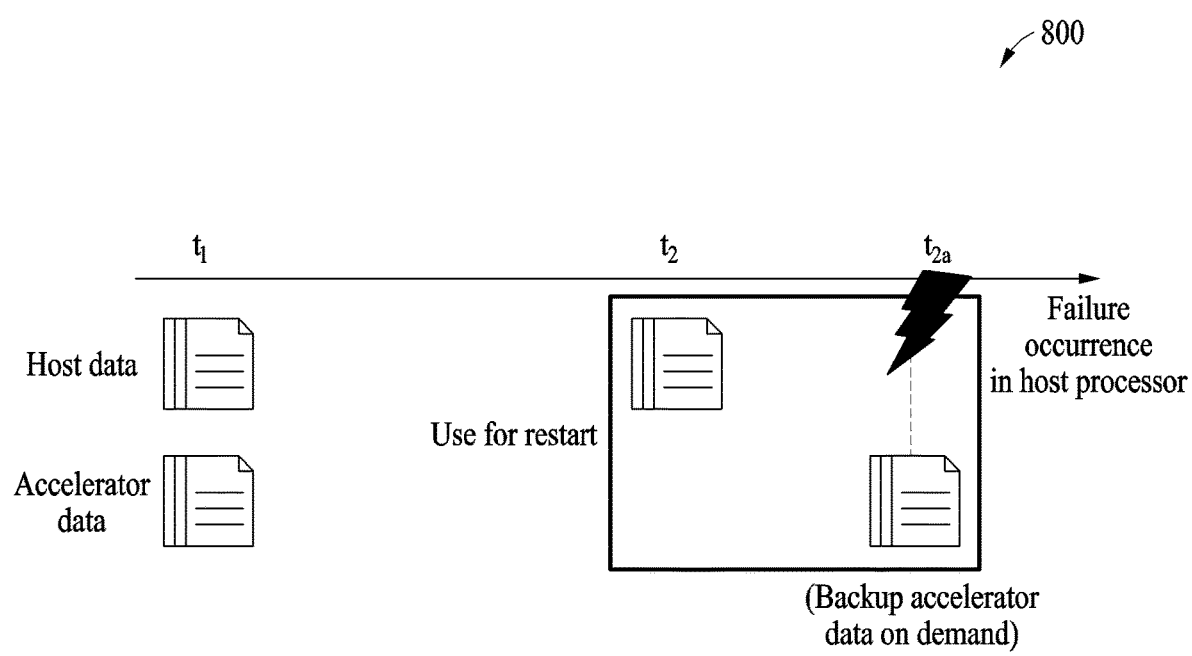
FIG. 8 illustrates an example of a recovery timed in response to a failure occurring in a host processor, according to one or more embodiments.

FIG. 8 illustrates an example 800 of a recovery timed in response to a failure occurring in a host processor, according to one or more embodiments.

Referring to FIG. 8, at time t1, a memory of the host processor and a memory of an accelerator both may be checkpointed as scheduled, and corresponding host data and accelerator data may be stored in a storage (internal and/or external). At time t2, only the memory of the host processor may be checkpointed, and that host data may be stored in the storage. Thereafter and before time t3 (before another scheduled checkpoint), at time t2a, a failure may occur in the host processor. As described above, this failure in the host processor may correspond to an accelerator-safe failure, and in this case, the memory of the accelerator may be checkpointed on demand.

When the on-demand checkpoint of the memory of the accelerator is completed, after a restart/reset of an electronic device, data most recently stored in the storage may be transmitted to the host processor and the accelerator. For example, the host data stored at time t2, which is the most recent host checkpoint, may be transmitted to the host processor, and the accelerator data stored on-demand at time t2a, which is the most recent accelerator checkpoint, may be transmitted to the accelerator.

As such, when the on-demand checkpoint of the memory of the accelerator is performed, the host processor and the accelerator may be recovered to states of respectively different times (i.e., the host and accelerator may be out of sync), which may contradict a typical checkpoint method in which a recovery time may be consistent across all components of a host. In other words, recovered state of an application with respect to the host processor may be inconsistent with recovered state of the application with respect to the accelerator. Methods of resolving such an inconsistency between recovery times will be described in detail with reference to FIGS. 9 and 10.

Figure 9:
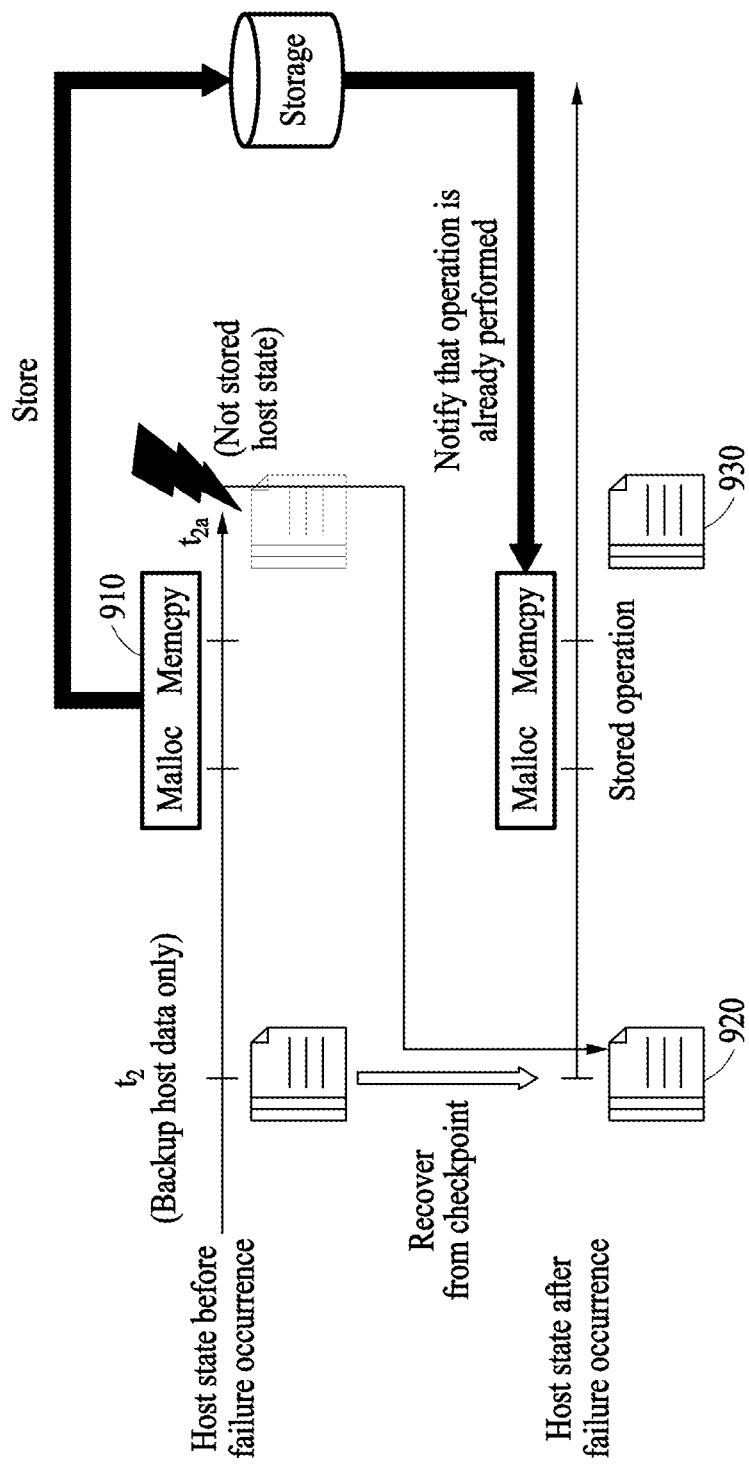
FIG. 9 illustrates an example of an operation of resolving an inconsistency between recovery times, according to one or more embodiments.

FIG. 9 illustrates an example of an operation of resolving a state inconsistency between a host processor and an accelerator that are recovered to respective different checkpoint times.

When recovery times of recovered data of a host processor and recovered data of an accelerator, respectively, are inconsistent due to an on-demand checkpoint of a memory of the accelerator, methods of resolving such an inconsistency may be as follows.

A first method may be ignoring (or accepting as-is) host data recovered in the host processor and performing an application operation after recovery or recovering to data at inconsistent times and performing the operation after recovery. This method may be applicable when executing an application which may only need to maintain accelerator data for practical performance of the application. In other words, the application may execute based on the inconsistent states of the host processor and the accelerator, and their initially-inconsistent states may be updated in ongoing fashion by execution of the application.

For example, consider an application for performing an inference operation or a learning operation based on a neural network stored in the accelerator. In the case of an inference operation based on the neural network, relatively more-important data, such as a parameter, may be stored in the accelerator, and thus, regardless of the data of a host processor, the application may readily execute (the state inconsistency may be tolerable for purposes of the application using the neural network). In addition, in the case of a learning operation based on a neural network, even though a slight data error or deviation might occur during learning, such a slight data error or difference might not significantly affect a learning result (which might be performed over multiple learning iterations), and thus, restarting the application with data at inconsistent times may be sufficiently effective or practical for the application. However, examples may not be limited to the foregoing examples, and the first method may be applied, without limit, to any application of which data of an accelerator is more important than that of a host processor.

A second method may be storing (e.g., logging or journaling), in a storage, indicia of operations 910 performed in a host processor (e.g., for an application) from a time (e.g., time t2 of FIG. 9) when the host processor is most recently checkpointed, up until a time (e.g., time t2a of FIG. 9) when a failure occurs (or until a new host checkpoint is captured, at which time the storing of the indicia of operations may be started anew). The thus-stored indicia of operations 910 may be applied to a recovered state 920 of the host processor, to obtain or recover a state 930 that the host processor had when the failure occurred at time t2a.

With this method, when the storage stores indicia of operations 910 performed in the host processor from time t2 up until time t2a, the storage may store, for each invocation of a function (e.g., malloc( ), memcpy( ), etc.), an identify of the function, a parameter of the function, and a return value of the function. This technique may provide a record or history (log) of entries indicating which functions were executed, in which order, and to what extent. A size of such an operation log or journal of the host processor may not be large and storing the operation log/journal thereof in the storage may accordingly have low overhead. Techniques for monitoring and capturing function calls or the like are known and description thereof may be found elsewhere.

As noted, the initially recovered state 920 of the host processor may be a state where operations 910 (indicia of which is stored in the storage) have not been applied, however, a state of an accelerator checkpointed on demand in response to a failure occurring in the host processor may correspond to time t2a (a time when operations 910 have been performed and state of the accelerator corresponds thereto). Therefore, the host processor may be adjusted, with the stored record of operations 910, to the state 930 at time t2a such that recovery times are consistent. While updating the host processor to the state 930 to correspond to its state at time t2a, the accelerator may maintain the recovered state as recovered from its on-demand checkpoint, e.g., the accelerator may be idle while the host processor "catches up" with the accelerator using the stored indicia of the operations 910.

Operations 910 may include, for example, operations that change a state and/or the memory of the accelerator or operations that read the state and/or the memory of the accelerator. Because such operations have already been applied to (or affected) the recovered accelerator, executing the one or more operations again may need to be prevented to preserve the accelerator's state to correspond to time t2a. For example, a dummy device (e.g., a temporary virtual device) may be configured (or connected to) as a target for the host processor while the stored operations 910 are applied to the host processor, and then the accelerator may be reconnected to the host processor.

As another example, among the stored indicated operations 910, operations that would change the state and/or the memory of the accelerator may not be executed in the host processor after recovery and may be skipped. In addition, operations among the stored operations 910 that read the state and/or the memory of the accelerator may not be executed in the host processor. Instead, result values of the operations may be transmitted from the storage to the host processor and may be used to update the state of the host processor.

As a result, while maintaining the state of the recovered accelerator (i.e., not allowing the accelerator state to change), the state 930 of the host processor at time t2a may be obtained (reconstituted) from the recovered state 920 of the host processor corresponding to time t2. Then, the state of the recovered accelerator may correspond to state at time t2a, and the host processor and the accelerator may thus have consistent states.

Figure 10:
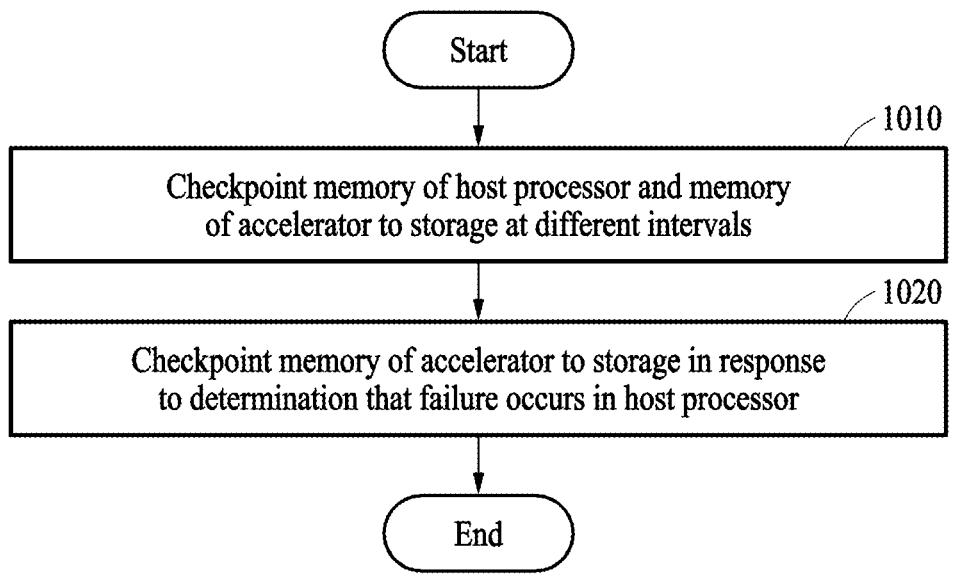
FIG. 10 illustrates an example of an operating method of an electronic device, according to one or more embodiments.

FIG. 10 illustrates an example of an operating method of an electronic device, according to one or more embodiments.

In the following examples, operations may be performed sequentially, but not necessarily limited thereto. For example, the order of the operations may change, and at least two of the operations may be performed in parallel. Operations 1010 through 1020 may be performed by at least one component (e.g., a host processor, an accelerator, etc.) of the electronic device.

In operation 1010, the electronic device may checkpoint, to a storage, a memory of the host processor and a memory of the accelerator at different intervals or frequencies. For example, the electronic device may checkpoint the memory of the host processor to the storage at a first interval and the memory of the accelerator to the storage at a second interval that is longer than the first interval. The first interval (e.g., the length, duration, or timing thereof) may be determined based on information indicating a failure frequency of the host processor, and the second interval may be determined based on information indicating a failure frequency of the accelerator.

In operation 1020, in response to a determination that a failure has occurred in the host processor, the electronic device may on-demand checkpoint the memory of the accelerator to the storage. The electronic device, without necessarily involving the host processor, may transmit data stored in the memory of the accelerator to the storage.

In addition, when the memory of the accelerator is on-demand checkpointed to the storage in response to a failure occurring in the host processor, the host processor may be restarted or reset, may receive a most-recently checkpointed host data from the storage to the host processor, and may receive the accelerator data that was checkpointed (in response to the failure occurring in the host processor, i.e., on-demand) from the storage to the accelerator.

In addition, the electronic device may store operations (indicia thereof) performed in the host processor from a time of its most recent checkpoint up until a failure occurs in the host processor, and when the host processor receives the host data from the storage, only some of the operations performed before the failure occurred in the host processor may be executed in (or applied to) the host processor. In this case, while the host processor re-executes (or re-applies) the some of the operations that were performed before the failure occurred, the accelerator may maintain the accelerator data received from the storage. The electronic device may not re-execute (or re-apply), in the host processor, among the stored operations, those operations that would change a state and/or the memory of the accelerator. For example, the electronic device may not execute (or apply), among the stored operations, operations that read the state and/or the memory of the accelerator, and instead may receive result values of the operations from the storage and apply them to the host processor.

The descriptions provided with reference to FIGS. 1 through 9 may also apply to the operations provided with reference to FIG. 10, and thus, a further detailed description thereof is omitted.

The computing apparatuses, the electronic devices, the processors, the memories, the information output system and hardware, the storage devices, and other apparatuses, devices, units, modules, and components described herein with respect to FIGS. 1-10 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-10 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above disclosure, the scope of the disclosure may also be defined by the claims and their equivalents, and all variations within the scope of the claims and their equivalents are to be construed as being included in the disclosure.

What is claimed is:

1. An electronic device comprising:
a host processor; and
an accelerator configured to operate according to instructions transmitted by the host processor to the accelerator,
wherein a memory of the host processor is host-checkpointed, to a storage at a first interval, as respective host-checkpoints in the storage,
wherein a memory of the accelerator is first accelerator-checkpointed, to the storage at a second interval, as respective first accelerator-checkpoints in the storage, where the second interval is different from the first interval, and
wherein, in response to a determination that a failure has occurred in the host processor, the memory of the accelerator is second accelerator-checkpointed to the storage as a second accelerator-checkpoint in the storage.

2. The electronic device of claim 1, wherein, for the second accelerator-checkpointing, data stored in the memory of the accelerator is transmitted to, and stored in, the storage without involving the host processor.

3. The electronic device of claim 1, wherein the second interval that is longer than the first interval.

4. The electronic device of claim 3,
wherein the first interval is determined based on a failure rate of the host processor, and
wherein the second interval is determined based on a failure rate of the accelerator that is different than the failure rate of the host processor.

5. The electronic device of claim 1,
wherein the host processor is configured to, when the second accelerator-checkpointing is performed and after the host processor is correspondingly restarted or reset, receive a most recent host-checkpoint of the respective host checkpoints from the storage, and
wherein the accelerator is configured to, dependent on the determination that the failure has occurred, receive the second accelerator-checkpoint from the storage.

6. The electronic device of claim 5, wherein the electronic device is configured to:

store, in the storage, an indicia of operations that were performed in the host processor before the failure occurred;
execute or apply, based on the received most recent host-checkpoint, at least some of multiple operations indicated by the indicia of operations; and
maintain the received second accelerator checkpoint in the memory of the accelerator while the host processor performs the execution or application of the at least some of the multiple operations.

7. The electronic device of claim 6, wherein the at least some of the multiple operations do not include an operation that will change a state and/or the memory of the accelerator when executed by the host processor.

8. The electronic device of claim 6, wherein, for the execution or application of the at least some of the multiple operations, the host processor is configured to apply one or more respective operations that correspond to a reading of a state and/or the memory of the accelerator by receiving, from the storage, previously stored result values of the one or more respective operations.

9. The electronic device of claim 1, wherein the accelerator is configured to receive, as generated by an external device configured to monitor whether the failure occurs in the host processor, an instruction for performing the second accelerator-checkpointing dependent on the external device detecting that the failure has occurred in the host processor.

10. The electronic device of claim 1, further comprising a controller configured to monitor whether the failure occurs in the host processor,
wherein the controller is configured to transmit an instruction to the accelerator to perform the second accelerator-checkpointing when the controller detects that the failure has occurred in the host processor.

11. The electronic device of claim 1, wherein the electronic device is configured to:
set a state of the electronic device through:
performance of a loading, to the memory of the accelerator, of the second accelerator-checkpoint; and
performance of a loading, to the memory of the host processor, of a most recent host-checkpoint among the respective host checkpoints; and
resume execution of the application according to the set state,
wherein the second accelerator-checkpointing is dependent on operations, of an application,
that occur after a capture time of the most recent host-checkpoint.

12. The electronic device of claim 11, wherein the execution of the application comprises performing training of, or inferencing using, the accelerator in the set state.

13. The electronic device of claim 1, wherein the host processor is configured to respectively perform one or more operations with respect to a training of a machine learning model and/or a generating of an inference result using the machine learning model: and
based on information in the memory of the host processor before a capture time of a most recently captured host-checkpoint of the respective host-checkpoints, and restored information, restored using the most recently captured host-checkpoint, in the memory of the host processor after the failure has occurred,
wherein information that exists in the memory of the host processor during a lost host data period of time, from the capture time to a time at which the failure occurs, is lost after the failure occurs or as a result of the restoration.

14. The electronic device of claim 13, wherein the respective performance of the one or more operations is further based on an application by the host processor of result values of some operations performed during the lost host data period of time.

15. The electronic device of claim 14,
wherein the some operations are determined based on a stored indicia of multiple operations performed in the host processor during the lost host data period of time, and
wherein the indicia is reset when the failure occurs.

16. A method comprising:
capturing, to a storage, host-checkpoints of a memory of a host processor of an electronic device, wherein the host-checkpoints are captured at first intervals;
capturing, to the storage, accelerator-checkpoints of a memory of an accelerator of the electronic device, wherein the accelerator-checkpoints are captured at second intervals that are different from the first intervals; and
based on a failure occurring in the host processor, capturing a failure-checkpoint of the memory of the accelerator to the storage.

17. The method of claim 16, wherein the capturing of the failure-checkpoint to the storage includes capturing the failure-checkpoint to the storage without involving the host processor.

18. The method of claim 16,
wherein a duration of the first intervals is proportional to a failure rate of the host processor, and
wherein a duration of the second intervals is proportional to a failure rate of the accelerator.

19. The method of claim 16, further comprising:
in association with the failure occurring in the host processor:
restarting or resetting the host processor;
restoring a most recently captured host-checkpoint, of the captured host-checkpoints, from the storage to the memory of the host processor; and
restoring the failure-checkpoint from the storage to the memory of the accelerator.

20. The method of claim 19, further comprising:
logging, to the storage, an indicia of operations performed in the host processor during a period of time from a corresponding capture time of the most recently captured host-checkpoint to a time at which the failure occurred; and
based on the restored most recently captured host-checkpoint, executing or applying by the host processor, at least some of multiple operations indicated by the indicia of operations,
wherein the accelerator, while the host processor executes or applies the at least some of the multiple operations, maintains the restored failure-checkpoint such that the restored failure-checkpoint in the memory of the accelerator does not change in response to the execution or application of the at least some of the multiple operations.

21. The method of claim 20,
wherein the at least some of the multiple operations do not include one or more operations, of the multiple operations, that will change a state and/or the memory of the accelerator when executed by the host processor, or
wherein the executing or applying by the host processor comprises:
applying one or more operations, of the multiple operations, that read a state and/or the memory of the accelerator by receiving, from the storage, result values of the one or more operations from the storage, the result values having been stored in the storage by the logging.

22. The method of claim 16, further comprising:
restoring, after the failure has occurred, information in the memory of the host processor using a most recently captured host-checkpoint of the host-checkpoints; and
respectively performing one or more operations with respect to a training of a machine learning model and/or a generating of an inference result using the machine learning model,
based on information in the memory of the host processor before a capture time of the most recently captured host-checkpoint and the restored information,
wherein information that exists in the memory of the host processor during a lost host data period of time, from the capture time to a time at which the failure occurs, is lost after the failure occurs or as a result of the restoring.

23. The method of claim 22, wherein the second intervals are longer than the first intervals.

24. The method of claim 23, wherein the respective performing of the one or more operations comprises applying, by the host processor after the failure occurs, result values of some operations performed in the host processor during the lost host data period of time.

25. The method of claim 24,
wherein the some operations are determined based on a stored indicia of multiple operations performed in the host processor during the lost host data period of time, and
wherein the indicia is reset when the failure occurs.

26. A method comprising:
before a current failure, which occurs in a host processor:
executing operations of an application on a host processor and on an accelerator, wherein a host memory of the host processor and an accelerator memory of the accelerator are updated as the operations are respectively executed; and
periodically capturing a host-checkpoint of the host memory to a storage;
responsive to the occurrence of the current failure, capturing an on-demand accelerator-checkpoint of the accelerator memory; and
after the occurrence of the current failure, resuming an execution of the operations of the application based on a result of a restoring of a most recently captured host-checkpoint, of the captured host-checkpoints, from the storage to the host memory, and based on a result of a restoring of the on-demand accelerator-checkpoint from the storage to the accelerator memory.

27. The method of claim 26,
wherein the on-demand accelerator-checkpoint includes state information corresponding to a portion of the operations executed before the occurrence of the failure and after a capture time of the most recently captured host-checkpoint, and
wherein a host memory state information, corresponding to the portion of the operations, stored in the host memory prior to the occurrence of the current failure is lost from the host memory after the occurrence of the current failure.

* * * * *